Dec. 18, 1962 J. L. LEESON, JR., ETAL 3,069,600

SELECTIVE ENERGIZATION OF A PLURALITY OF LOAD DEVICES BY BI-STATE CONTROLS

Filed June 26, 1958

INVENTORS
James L. Leeson Jr
Paul F. Smith
by Carlson, Pitzner, Hubbard & Wolfe
ATTORNEYS United States Patent Office 3,069,600 Patented Dec. 18, 1962

3,069,600

SELECTIVE ENERGIZATION OF A PLURALITY OF LOAD DEVICES BY BI-STATE CONTROLS

James L. Leeson, Jr., and Paul F. Smith, Beloit, Wis., assignors to Warner Electric Brake & Clutch Company, South Beloit, Ill., a corporation of Illinois Filed June 26, 1958, Ser. No. 744,832
7 Claims. (Cl. 317—148.5)

This invention relates to apparatus for controlling a plurality of load devices and the primary object is to take advantage of unique characteristics of transistors to achieve simplicity and versatility in the selective energization of the load devices.

Another object is to energize the load devices individually through different transistors which are interconnected in a novel manner to achieve a desired order of energization of the devices. A more detailed object is to interconnect two transistors and two load devices with the transistor for a third device in a novel manner enabling a change in the conductive state of the third transistor to be utilized to control the conductive states of the first two transistors simultaneously.

Other objects and advantages of the invention will become apparent from the following detailed description taken in connection with the accompanying drawings, in which.

Figure 1:
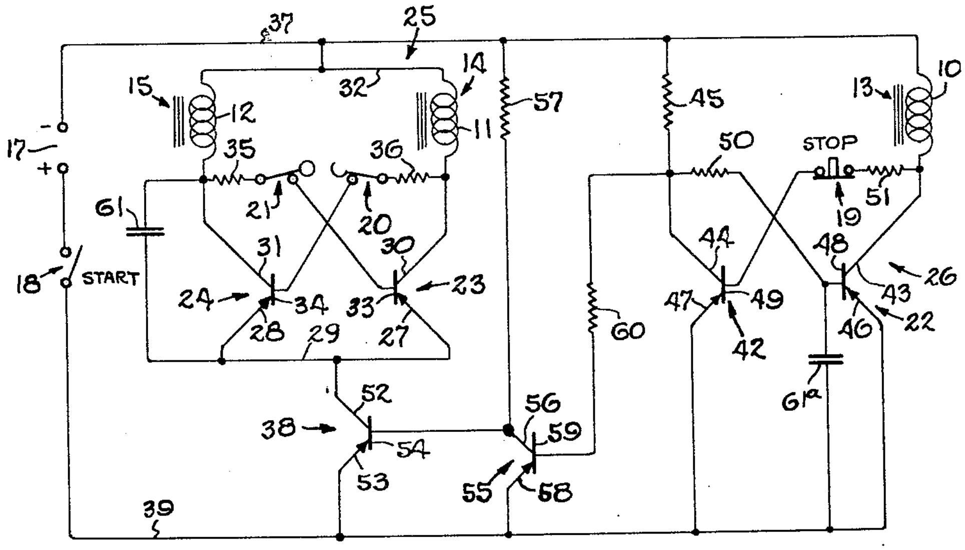
FIGURE 1 is a schematic view and wiring diagram of control apparatus embodying the novel features of the present invention.

The invention is shown in the drawings for purposes of illustration embodied in a control for the windings 10, 11 and 12 of three electromagnets 13, 14 and 15. These load devices are adapted for energization from a suitable source 17 of direct curent and, for example, may be the parts of a brake and two clutches operable when energized to apply a retarding torque or transmit driving torques in opposite directions to a driven shaft (not shown). Circuits for energizing the magnet windings selectively are completed in response to actuation of various switches 18, 19, 20 and 21. In this instance, those switches 18 and 19 labeled "start" and "stop" are operated manually and the other switches 20 and 21 are intended for operation automatically as the driven part reaches the limits of its range of movement. With the load devices acting in opposition to each other, it is desirable that only one be energized at a time while the others are deenergized.

The present invention contemplates utilizing transistors and taking advantage of their peculiar characteristics to achieve the desired selective energization of the magnet windings 10, 11 and 12 under the control of the switches 19, 20 and 21 by a simple and versatile circuit arrangement having no moving parts other than the switch contacts. One such characteristic of transistors is their ability to switch between fully off and fully conductive states merely by the application and removal of a conductive bias as distinguished from the application of different voltages of opposite polarities to their input circuits. Also the level of voltages applied between the input electrodes to place a transistor in its fully conductive state is in approximately the same range instead of much lower than the operating voltage of the collector. These characteristics enable one transistor through connection of its input electrodes to the output circuit of another transistor, and without moving parts, to be switched between cut-off and a saturated state as the other transistor respectively conducts and is cut off.

In accordance with the invention, the windings 10, 11 and 12 are connected individually in the output circuits of interconnected transistors 22, 23 and 24 whose control circuits include the switches 18, 19, 20 and 21. The clutch windings 11 and 12 and their transistors 23 and 24 are connected in a switching unit 25 which, when it is supplied power from the source 17, operates to energize the windings selectively and alternately in response to energization of the limit switches 20 and 21. Completion and interruption of the circuit through the clutch switching unit and the source are effected respectively as an incident to deenergization and energization of the brake winding 10 by another switching unit 26. The latter includes the brake and its transistor 22 and is controlled by the start and stop switches 18 and 19.

To energize only one of the clutch windings 11 and 12 when the clutch switching unit 25 is connected to the source 17, the input circuit of each of the transistors 23 and 24 of this unit is connected to the output circuit of the other transistor so that conduction and nonconduction by each transistor are utilized respectively to remove conductive bias from and to apply such bias to the input circuit of the other transistor. The input circuit and output circuit of each transistor extend respectively from an input electrode and from an output electrode to a common electrode of the transistor, the output circuit including the associated clutch winding.

The desired alternate conduction by the transistors 23 and 24 of the clutch unit 25 is effected by connecting the common electrodes 27 and 28 to each other and connecting the input electrode of each transistor to the output electrode of the other transistor. With this arrangement, conduction by either transistor in a "fully on" or saturated state results in the removal of conductive bias from the input of the other transistor so as to switch the latter to its nonconductive or "off" state.

In the present instance, the emitters of the two transistors 23 and 24 are the common electrodes 27 and 28 and these are connected together by a common conductor 29. The collectors 30 and 31 are the output electrodes which are connected through their respective clutch windings 11 and 12 to another common conductor 32. Connecting the bases or input electrodes 33 and 34 to the collectors 31 and 30 are series resistors 35 and 36 which serve to limit the base current flow.

The common conductors 29 and 32 of the clutch switching unit 25 are connected to the source 17 so as to bias the collectors 30 and 31 in a so-called nonconductive direction with respect to the emitters 27 and 28. In the case of p-n-p junction type transistors such as those shown, each collector is biased nonconductively when it is at a negative potential with respect to the base, the polarities being reversed for an n-p-n transistor. Herein, the common collector conductor 32 is connected to the negative terminal of the source through a conductor 37 to bias the collectors nonconductively. Connecting the common emitter conductor 29 to the positive terminal of the source is a switching device 38 and a conductor 39.

When the circuit through the source 17 and the clutch switching unit 25 is completed and one transistor 23 is in a fully conductive state, its emitter-to-collector voltage which is applied between the base 34 and emitter 28 of the other transistor 24 is substantially zero so that the other transistor is cut-off. When the conducting transistor ceases conducting, its emitter-to-collector voltage approaches that of the source and is applied to the input circuit of the other transistor so that the latter is switched to its fully conductive state.

Changes in the conductive states of the clutch transistors 23 and 24 in response to actuation of the limit switches 20 and 21 may be effected in various ways. For example, as shown in FIG. 1, these switches may be of the normally closed type connected individually in series with the resistors 36 and 35 between the bases 33 and 34 and the collectors 31 and 30 of the transistors. The effect of opening either of these switches is interruption of the base-to-emitter or input circuit of the associated transistor so that the latter is rendered nonconductive.

Figure 2:
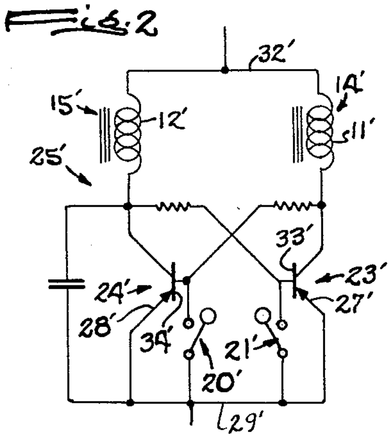
FIGS. 2, 3 and 4 are fragmentary views similar to FIG. 1 showing modified circuit arrangements.
Figure 3:
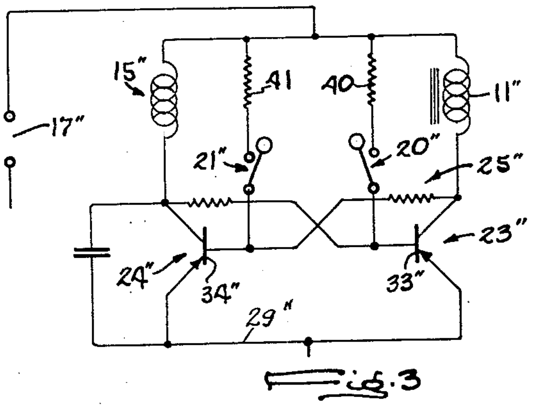

Alternative arrangements of the limit switches are shown in FIGS. 2 and 3. In FIG. 2 where parts corresponding to FIG. 1 bear similar but primed reference characters, normally open limit switches 20′ and 21′ are connected in separate circuits between the bases 34′ and 33′ and emitters 27′ and 28′ of the transistors 23′ and 24′ of the clutch switching unit 25′. With this arrangement, closure of either switch completes a short circuit between the input electrodes of the associated transistor and the latter thereby is rendered nonconductive, the other transistor then becoming conductive the same as in the clutch switching unit 25 of FIG. 1.

The parts of the clutch switching unit 25″ of FIG. 3 which correspond to the parts of FIG. 1 have similar reference characters with double primes. In this modification, limit switches 20″ and 21″ of the normally open type are connected in series with resistors 40 and 41 in separate circuits between the bases 33″ and 34″ of the transistors 23″ and 24″ and the common collector conductor 32″. In this case, closure of either switch connects the base of the associated transistor to the collector side of the source 17″ so that conductive bias is applied between the base and the emitter to render the transistor conductive. This is accompanied by a drop in the emitter-to-collector voltage of the other transistor so that the latter is cut-off.

To avoid oscillations due to undesired changes in the conductive states of the transistors 23 and 24 of the clutch switching unit 25, the various parameters of this circuit are selected so that each transistor is switched between a fully "off" nonconductive state and a fully "on" or saturated conductive state. With the source 17, for example, supplying 30 volts D.C. and each of the clutch windings 11 and 12 rated to operate at 28 volts, satisfactory switching was achieved using p-n-p transistors manufactured by Tung-Sol Electric Inc., of Newark, New Jersey, under model No. TS613 when the resistors 35 and 36 in series with the bases 34 and 33 each had a resistance of 1500 ohms.

The brake switching unit 26 is similar to the clutch unit 25 in the provision of a second transistor 42 which is interconnected with the brake transistor 22 the same as the transistors 23 and 24 are interconnected. Thus, the collectors 43 and 44 are connected individually through the brake winding 10 and a load impedance resistor 45 to the negative source conductor 37 and the emitters 46 and 47 are connected directly to the other source conductor 39. The bases 48 and 49 are connected to the collectors 44 and 43 through resistors 50 and 51. To render the brake transistor conductive in response to actuation of the stop switch 19, the latter is a normally closed switch located in series with the base 49 of the other transistor 42. Upon opening of this switch, the second transistor is rendered nonconductive for application of the source voltage to the input circuit of the brake transistor 22 thereby rendering the latter conductive. As in the case of the clutch switching unit, the parameters of the brake unit are selected so that each transistor is either fully cut-off or in a saturated conductive state.

To maintain both clutches 14 and 15 deenergized while the brake 13 is energized, the switching device 38 in series with the clutch unit 25 is operated to complete and interrupt the circuit through this unit as an incident to nonconduction and conduction respectively by the transistor 22 for the brake winding 10. Preferably, and to avoid moving parts, this switching device is a transistor whose output circuit extends between its collector or output electrode 52 and its emitter 53 and through the clutch unit and the source 17. The base or input electrode 54 then is connected to the brake switching unit 26 so as to render the transistor conductive when the brake is deenergized. When the brake is energized, the transistor 38 is cut-off and the flow of current to the clutch switching unit thereby is interrupted.

The switching transistor 38 is a so-called power transistor capable of carrying the rather large currents required by the clutch windings 11 and 12. To retain control over the conductive states of the transistors 22 and 42 of the brake switching unit 26 and avoid undesired changes in these states, these transistors preferably are isolated from the power transistor and the large currents through the latter by an intervening switching transistor 55.

In the preferred circuit arrangement of FIG. 1, the collector 56 of the isolating transistor 55 is connected to one source conductor 37 through a load resistor 57 and the emitter 58 is connected directly to the other source conductor 39. The base 59 of the isolating transistor is connected through a current limiting resistor 60 to the collector 44 of the second transistor 42 of the brake switching unit 26. The isolating transistor then is cut-off and becomes conductive respectively as the second transistor 42 is rendered conductive and nonconductive. To vary conduction in the clutch switching transistor 38 with changes in the conductive state of the isolating transistor, the base 54 of the switching transistor is connected directly to the collector 56 of the isolating transistor 55. The switching transistor then is cut-off when the isolating transistor is conductive and conducts at the same time as the second transistor 42 of the brake unit when the isolating transistor is nonconductive.

Figure 4:
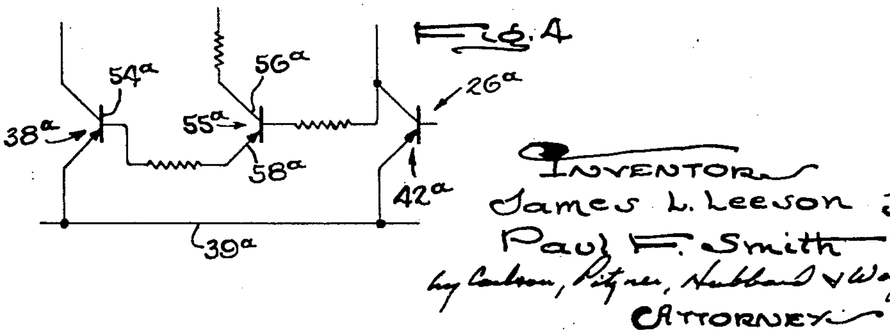

To avoid a phase or polarity inversion from the isolating transistor 55 to the clutch switching transistor 38, a different arrangement of the electrodes of these two transistors may be provided as indicated in FIG. 4 where parts corresponding to the parts of FIG. 1 bear similar reference characters with a suffix *a*. Referring to FIG. 4, it will be seen that the base 54*a* of the clutch switching transistor 38*a* is connected to the emitter 58*a* rather than the collector 56*a* of the isolating transistor 55*a* and the connection between the emitter 58*a* and the positive source conductor 39*a* is removed. This arrangement results in conduction by both of these transistors at the same time in response to cut-off of the second transistor 42*a* of the braking unit 26*a*.

In each of the clutch and brake switching units 25 and 26 arranged as described thus far, either of the transistors may become conductive when power is supplied to the unit. To avoid such erratic conduction, the invention contemplates the provision in each unit of novel means for rendering the same transistor conductive each time the unit is connected initially to the power source 17. This means comprises a capacitance which is connected in the input circuit of one transistor of each unit and operates, after the unit is connected to the power source, to keep the input electrodes of the transistor at substantially the same potential and thereby maintain the transistor nonconductive for a long enough time to allow the other transistor of the unit to become conductive. This capacitance, as in the case of the brake switching unit, may be a capacitor 61*a* connected directly between the base 48 and the emitter 46 of the brake transistor 22. With this arrangement, the capacitor acts as a momentary short circuit bringing the base and emitter of the brake transistor to the same potential so that this transistor does not conduct when power is applied to the brake unit.

An alternative and preferred location of the capacitance is used in the clutch switching unit 25. There, the capacitor 61 is connected directly between the collector 31 and the emitter 28 of the left hand transistor 24 and thus through the series resistor 35 and limit switch 21 to the base 33 and emitter 27 of the right hand transistor 23. When power is supplied to the clutch switching unit with this capacitor location, the capacitor not only causes nonconduction by the right hand transistor 25 by bringing its input electrodes to the same potential, but also hastens conduction through the left hand transistor by bringing its emitter 28 and collector 31 to the same potential.

In the operation of the improved apparatus, let it be assumed that power is available at the source 17 and that the start switch 18 has just been closed. The capacitor 61*a* then acts for a brief period as a short circuit between the base 48 and the emitter 46 of the brake transistor 22 and the latter thereby remains cut-off with the brake 13 deenergized. The voltage of the source, however, appears between the base 49 and emitter 47 of the second transistor 42 to render this transistor conductive and thereby maintain the potential across the capacitor and between the base and emitter of the brake transistor substantially at zero. During conduction by the second transistor, current flowing through the base 49 thereof also flows through the brake winding 10. This current is limited, however, by the resistor 51 to a low value such that the brake 13 remains in a released condition.

Conduction by the second transistor 42 of the brake unit 26 is accompanied by a substantially zero potential between its collector 44 and emitter 47 and thus between the input electrodes 59 and 58 of the isolating transistor 55. The latter thereby is cut-off so that the clutch switching transistor 38 is turned on. As soon as this occurs and assuming that both limit switches 20 and 21 are closed, the capacitor 61 maintains the associated clutch transistor 23 nonconductive long enough that the other transistor 24 becomes fully conductive for energization of its winding 12. This conduction prevails until the limit switch 20 is opened or the clutch switching transistor 38 it cut-off. Opening of the switch 20 interrupts the base circuit of the conducting transistor 24 so that it becomes nonconductive and the source voltage is applied to the input of the other transistor 23 to render the latter conductive for energization of its clutch winding 11. The latter remains energized until the other limit switch 21 is opened and then the first transistor 24 becomes conductive again. During conduction by each transistor, its base current flow through the clutch winding of the other transistor is kept at a low value for substantial deenergization of such clutch winding by virtue of the associated one of the current limiting resistors 35 and 36.

Deenergization of the brake winding 10 and alternate energization of the clutch winding 11 and 12 in response to actuation of the limit switches 20 and 21 continue until the stop switch 19 is opened. This interrupts the base circuit of the second transistor 42 of the brake unit 26 and this transistor thereby is switched to its fully "off" state. The input potentials of both the brake transistor 22 and the isolating transistor 55 thereby are brought substantially to the source potential so as to switch these transistors to their fully conductive states. Conduction by the brake transistor results in energization of the brake winding. When the isolating transistor conducts, its collector-emitter potential between the input electrodes 54 and 53 of the clutch switching transistor 38 drops substantially to zero to switch the latter transistor to its fully "off" state and thereby interrupt the circuit through the clutch switching unit 25. The clutch windings then remain deenergized and the brake winding remains energized until the start switch 18 is opened to interrupt all energizing circuits.

It will be apparent that only one of the three windings 10, 11 and 12 may be energized at a time. Such operation is insured by interconnecting the clutch windings for alternate energization in their switching unit 25 which itself is disabled and rendered effective through the series switching device 38 as an incident to energization and deenergization of the brake winding. By virtue of the isolating transistor 55, the conductive states of the brake unit transistors 22 and 42 remain stable in spite of heavy currents flowing in the base circuit of the clutch switching transistor 38. Selective control of energization of the windings is insured further by the capacitors 61 and 61*a* which in their respective switching units 25 and 26, cause the same one of two transistors to conduct initially each time that power is supplied to the unit.

I claim as my invention:

1. The combination with first and second electric loads to be complementally energized and a third load to be energized when neither of the other two loads is energized, of first and second controlled discharge devices, means cross-connecting said first and second devices to form a first bi-stable unit and including means connecting said third load in series with said first device, third and fourth controlled discharge devices, means cross-connecting said third and fourth devices to form a second bi-stable unit and with said first and second loads in series respectively with the third and fourth devices, means for selectively switching conduction of said third and fourth devices, means for selectively switching conduction of said first and second devices, and means for preventing conduction by either of said third or fourth devices when said first device is conductive.

2. The combination of two conductors adapted for connection to a current source, a first bistate unit including first and second transistors each having input, output and control terminals, first and second load impedance elements, means connecting the input and output terminals of said first and second transistors respectively in series with said first and second impedance elements and across said two conductors, means connecting the control terminal of said first and second transistors respectively to the output terminal of the second and first transistor, selectively operable switch means for setting the complemental conductive states of said first and second transistors, a second bistate unit including third, fourth and fifth transistors each having input, output and control terminals, third and fourth load impedance elements, means connecting the input and output terminals of said fourth transistor in series with said third impedance element and the input and output terminals of said third transistor and for connecting such series combination across said two conductors, means connecting said input and output terminals of said fifth transistor in series with said fourth impedance element and the input and output terminals of said third transistor and for connecting such series combination across said two conductors, means connecting the output terminals of said fourth and fifth transistors respectively to the control terminals of the fifth and fourth transistors, selectively operable switch means for setting the complemental conductive states of said fourth and fifth transistors, and means connected between the output terminal of said first transistor and the control terminal of said third transistor for rendering the latter conductive or nonconductive whenever said first bistate unit is in respective ones of its two conductive states.

3. The combination set forth in claim 2, further characterized by a capacitor connected between the input and control terminals of one of said first and second transistors, thereby to make the first bistate unit assume a particular one of its two states when said two conductors are initially connected to a current source.

4. The combination of two conductors adapted for connection to a current source, a first bistate unit including first and second transistors each having input, output and control terminals, first and second load impedance elements, means connecting the input and output terminals of said first and second transistors respectively in series with said first and second impedance elements and across said two conductors, means cross-connecting the output terminals of the first and second transistors respectively to the control terminal of the second and first transistors, one of said cross-connecting means including a selectively actuatable normally closed switch, a second bistate unit including third and fourth transistors each having input, output and control terminals, third and fourth load impedance elements, means connecting the input and output terminals of said third and fourth transistors respectively in series with said third and fourth impedance elements and across said two conductors, said last-named means including a selectively conductive device common to both of said series connections, means including two selectively actuatable, normally closed switches respectively cross-connecting the output terminals of said third and fourth transistors to the control terminal of the other one of such transistors, and means connected to said first bistate unit for rendering said device respectively conductive or nonconductive when said first transistor is nonconductive or conductive, whereby neither of said third and fourth impedance elements is energized when said first impedance element is energized.

5. The combination of two conductors adapted for connection to a current source, a bistate unit including first, second and third transistors each having input, output and control terminals, first and second load impedance elements, means connecting said output terminals of said first and second transistors to one of said conductors respectively through said first and second impedance elements, means for connecting said input and output terminal of said third transistor in series between the other of said conductors and both of the input terminals of said first and second transistors, means respectively cross-connecting the output terminals of said first and second transistors to the control terminals of the first and second transistors, means including first and second switches for selectively setting respective ones of said first and second transistors in their non-conductive state, and means connected with the control terminal of said third transistor for selectively controlling the conduction of the latter.

6. The combination of two conductors adapted for connection to a current source, first and second transistors each having input, output and control terminals, forward and reverse clutch coils, means connecting the output terminals of said first and second transistors to one of said conductors respectively through said forward and reverse coils, means connecting both of said input terminals to the other of said conductors, a forward limit switch having normally closed contacts connected between the output terminal of said second transistor and the control terminal of said first transistor, and a reverse limit switch having normally closed contacts connected between the output terminal of said first transistor and the control terminal of said second transistor.

7. The combination of two input conductors adapted for connection to a source of current, a bistate unit including first and second transistors each having input, output and control terminals, first and second load impedance elements, means connecting the input and output terminals of said transistors respectively in series with said first and second impedance elements and across said two conductors, means cross-connecting the output terminal of each of said transistors to the control terminal of the other transistor, means including a switch selectively openable or closable to complementally change the conduction or nonconduction of said transistors, and a capacitor connected between the input and control terminals of one of said transistors, so that said one transistor is made nonconductive and the other conductive when the bistate unit is initially put in operation.

References Cited in the file of this patent

UNITED STATES PATENTS

| | | |
|---|---|---|
| 2,441,963 | Gray | May 25, 1948 |
| 2,456,026 | Shenk | Dec. 14, 1948 |
| 2,536,808 | Higinbotham | Jan. 2, 1951 |
| 2,562,530 | Dickinson | July 31, 1951 |
| 2,802,941 | McConnell | Aug. 13, 1957 |
| 2,846,583 | Goldfischer | Aug. 5, 1958 |
| 2,920,216 | Brauer | Jan. 5, 1960 |
| 2,927,242 | Shultz | Mar. 1, 1960 |
| 2,973,438 | Clark | Feb. 28, 1961 |

OTHER REFERENCES

"High Speed N-Scale Counters" by Sharpless, Electronics, March 1948, page 123.